United States Patent
Yu et al.

(10) Patent No.: US 6,606,717 B1
(45) Date of Patent: Aug. 12, 2003

(54) CACHE CONTROL METHOD AND SYSTEM FOR MIXED STREAMING AND NON-STREAMING DATA

(75) Inventors: Sharon H. Yu, Laguna Niguel, CA (US); Gary K. Laatsch, Orange, CA (US); Quoc N. Dang, Brea, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 576 days.

(21) Appl. No.: 09/628,892

(22) Filed: Jul. 31, 2000

(51) Int. Cl.[7] .............................................. G06F 13/14
(52) U.S. Cl. ........................ 714/42; 714/6; 711/113
(58) Field of Search ....................... 714/42, 6; 711/113, 711/135

(56) References Cited

U.S. PATENT DOCUMENTS

| | | | | |
|---|---|---|---|---|
| 5,754,882 A | * | 5/1998 | Tobagi et al. .................. | 710/6 |
| 5,996,015 A | * | 11/1999 | Day et al. .................... | 709/226 |
| 6,061,504 A | * | 5/2000 | Tzelnic et al. ............... | 709/219 |
| 6,330,630 B1 | * | 12/2001 | Bell ........................... | 710/312 |
| 6,389,460 B1 | * | 5/2002 | Stewart et al. .............. | 709/217 |
| 6,396,907 B1 | * | 5/2002 | Didcock ................... | 379/88.17 |
| 6,496,980 B1 | * | 12/2002 | Tillman et al. ............... | 725/90 |

* cited by examiner

*Primary Examiner*—Scott Baderman
*Assistant Examiner*—Anne L. Damiano
(74) *Attorney, Agent, or Firm*—Milad G. Shara, Esq.; Howard H. Sheerlin, Esq.

(57) ABSTRACT

The present invention may be embodied in a cache control method for caching disk data in a disk drive configured to receive commands for both streaming and non-streaming data from a host. A lossy state record is provided for memory segments in a cache memory. The lossy state record allows hosts commands to be mixed for streaming and non-streaming data without flushing of cache data for a command mode change.

12 Claims, 3 Drawing Sheets

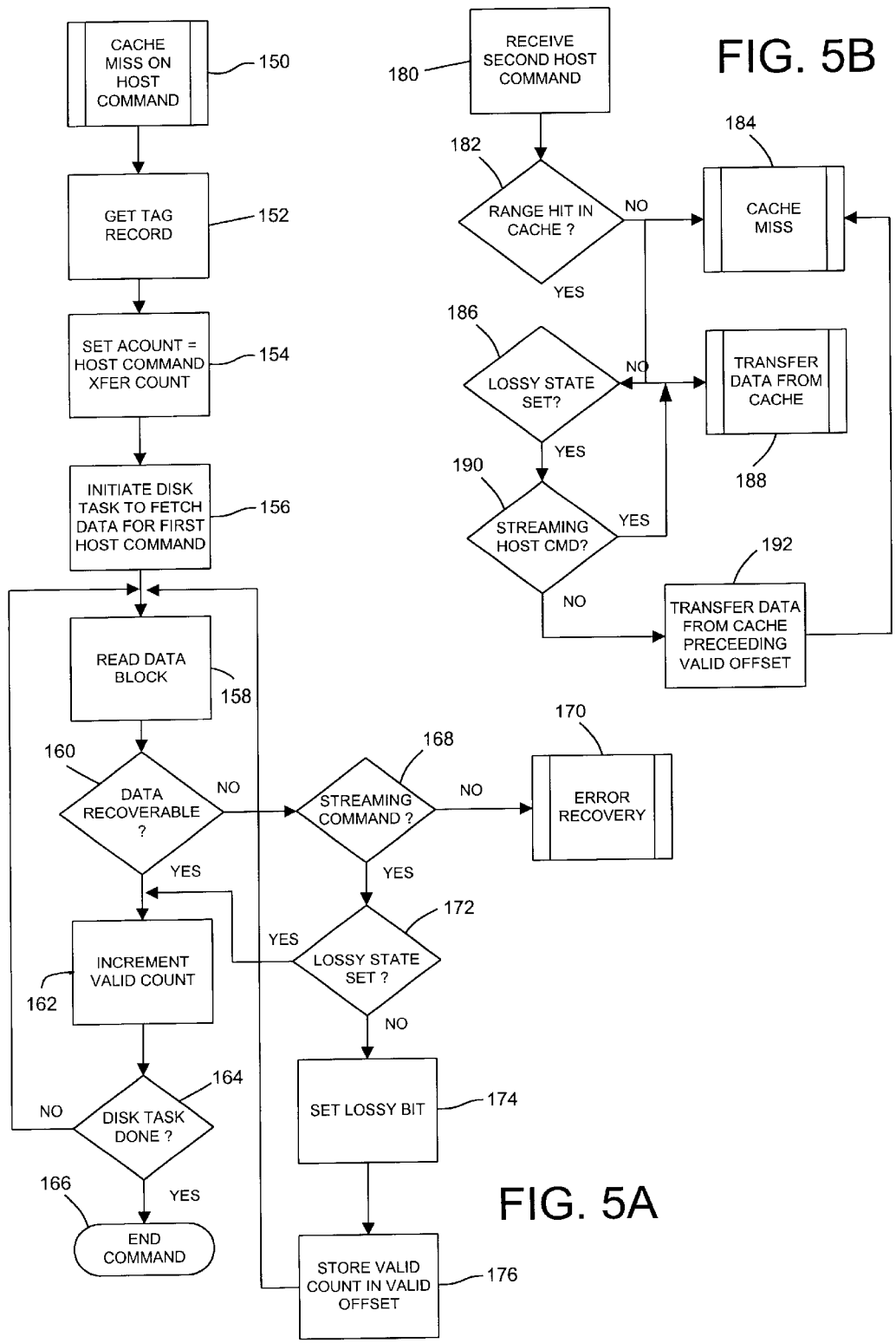

the cached data blocks may be transferred to the host. The subset may be the cached data blocks preceding the data block having an error. Further, a disk operation may be scheduled to recover the data block having an error.

Additionally, the host command may be a mode-change host command in that the host command is for streaming data following a previous command for non-streaming data or the host command is for non-streaming data following a previous command for streaming data. The plurality of data blocks may remain cached in the memory segment for the mode-change host command.

CACHE CONTROL METHOD AND SYSTEM FOR MIXED STREAMING AND NON-STREAMING DATA

BACKGROUND OF THE INVENTION

1. Field of the Invention

The present invention relates to disk drive performance features and more particularly to a disk drive having a cache control technique for caching both streaming and non-streaming data.

2. Description of the Prior Art

A host computer stores and accesses data on a disk drive by issuing commands to the disk drive over a standardized interface. The smallest indivisible data unit addressable on a disk is a disk sector or logical block which has an assigned logical block address (LBA). Existing disk drives typically have a semiconductor cache memory for temporarily storing disk data that is likely to be requested by a host computer. The semiconductor memory greatly enhances the performance of the disk drive because the semiconductor memory has a response time latency for storing and accessing data that is a much smaller than the response time latency for mechanically storing and accessing data stored on a rotating disk.

The nature of data stored in a disk drive may be generally defined as streaming data and non-streaming data. Streaming data is often associated with continuous audio and/or full-motion video data for live or real-time presentation to an audience. Non-streaming data is often associated with blocks of text data, numeric data and program control code. In order to provide a competitive product, a disk drive must provide high performance in an environment when both streaming and non-streaming data are accessed.

Accordingly, there exists a need for a disk drive having a disk data cache memory for effectively and efficiently responding to host commands for both streaming and non-streaming data. The present invention satisfies these needs.

SUMMARY OF THE INVENTION

The present invention is embodied in a method, and related apparatus, for caching disk data in a disk drive configured to receive commands for both streaming and non-streaming data from a host. In the method, a memory segment is provided for caching disk data associated with a logical block address range and a plurality of data blocks are cached in the memory segment. A lossy state record is provided for the memory segment. The lossy state record is set to be true if one of the plurality of data blocks in the memory segment contains a data error and is set to be false if no data error is in the cached data blocks. A host command specifying a commanded logical block address range is received and compared with the logical block address range cached in the memory segment to determine whether the commanded logical block address range overlaps the cached logical block address range. If the host command is for streaming data and the lossy state record is true, the cached data blocks of the overlapping commanded logical block address range, including the block containing the data error, are transferred to the host. Otherwise, if the host command is for non-streaming data, the lossy state record is checked and if the lossy state record is false, the cached data blocks of the overlapping commanded logical block address range are transferred to the host.

Also, for non-streaming data, the lossy state record may be checked and if the lossy state record is true, a subset of

BRIEF DESCRIPTION OF THE DRAWINGS

The accompanying drawings illustrate embodiments of the present invention and, together with the description, serve to explain the principles of the invention.

FIGS. 5A and 5B are a flow diagram of another embodiment of the method for caching disk data in a memory segment associated with a lossy state record, according to the present invention.

DETAILED DESCRIPTION

Figure 1:
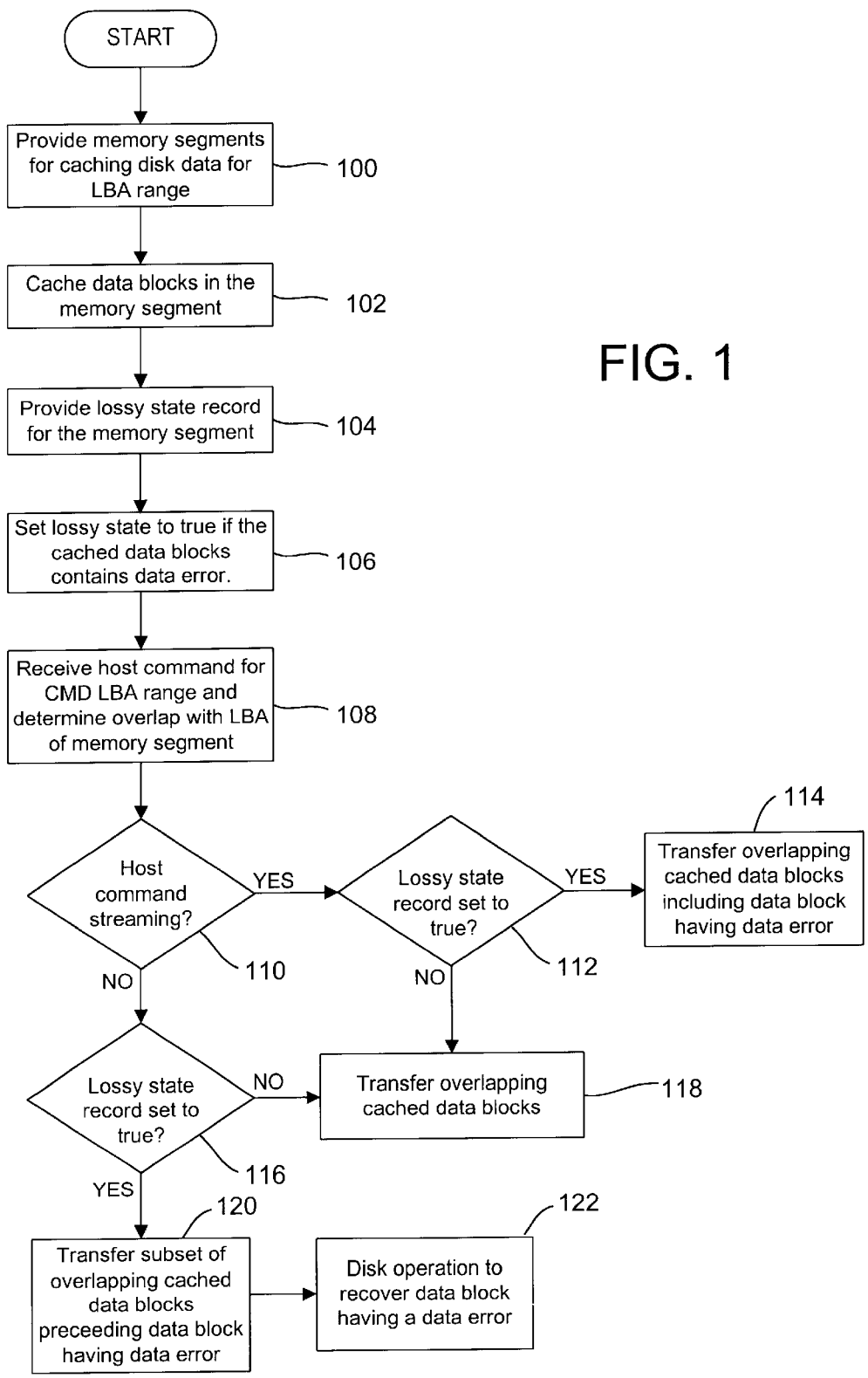
FIG. 1 is a flow diagram of a method for caching disk data in a memory segment associated with a lossy state record for response to host commands for both streaming and non-streaming data, according to the present invention.

With reference to FIG. 1, the present invention may be embodied in a cache control method for caching disk data in a disk drive configured to receive commands for both streaming and non-streaming data from a host. In the method, a memory segment is provided for caching disk data associated with a logical block address range (block 100) and a plurality of data blocks are cached in the memory segment (block 102). A lossy state record is provided for the memory segment (block 104). The lossy state record is set to be true if one of the plurality of data blocks in the memory segment contains a data error (block 106) and is set to be false if no data error is in the cached data blocks. A host command specifying a commanded logical block address range is received and compared with the logical block address range cached in the one memory segment to determine whether the commanded logical block address range overlaps the cached logical block address range (block 108). If the host command is for streaming data (block 110) and the lossy state record is true (block 112), the cached data blocks of the overlapping commanded logical block address range, including the block containing the data error, are transferred to the host (block 114). Otherwise, if the host command is for non-streaming data (block 110), the lossy state record is checked and if the lossy state record is false (block 116), the cached data blocks of the overlapping commanded logical block address range is transferred to the host (block 118).

Also, for non-streaming data (block 110), the lossy state record may be checked and if the lossy state record is true (block 116), a subset of the cached data blocks may be transferred to the host (block 120). The subset may be the cached data blocks preceding the data block having an error. Further, a disk operation may be scheduled to recover the data block having an error (block 122).

Additionally, the host command may be a mode-change host command in that the host command is for streaming data following a previous command for non-streaming data or the host command is for non-streaming data following a previous command for streaming data. The plurality of data blocks remains cached in the memory segment for the mode-change host command.

Data is stored on a disk drive in sectors with each sector having redundant data that permits correction of a predetermined number of data errors in the sector. Certain classes of data errors may be corrected in real time by the disk drive as data is read from the rotating disk. However, some data error cannot be corrected without additional rotations of the disk and/or application of more sophisticated and time-consuming signal processing and detection techniques.

For non-streaming data, such as program control code, the disk drive generally must provide the host with error free data. Accordingly, the host may wait while the drive performs the more time-consuming error correction techniques. However, for streaming data, such as a full-motion video presentation, a visual artifact caused by a data error may be less disruptive to the presentation than a halt in the video presentation caused by the host waiting for the disk drive. Accordingly, for streaming data, it may be desirable for the disk drive to provide the host with a data stream having data errors so that the host may maintain an acceptable presentation performance.

Traditionally, the host issues commands requesting the disk drive to provide error free (i.e., non-streaming) data to the host. More recently, host commands for streaming data have been proposed for acceptance as an industry standard. The disk drive may respond to a host command for streaming data with data that includes errors if the drive otherwise meets certain time-sensitive performance criteria. Typical data errors may include byte errors that may not be corrected in real time using a sector's redundant data.

Commonly, a disk drive's response to a "mode change" host command, e.g., a non-streaming host command after responding to a streaming host command, is for the drive to flush all of the existing data in the cache memory because the existing cached data may contain errors. After cache flushing, any data requested by the host must be read from the mechanically rotating disk drive which delays the drive's response to the host. The present invention advantageously allows the disk drive to respond to a mode change host command without flushing the current data already existing in the cache memory.

Figure 2:
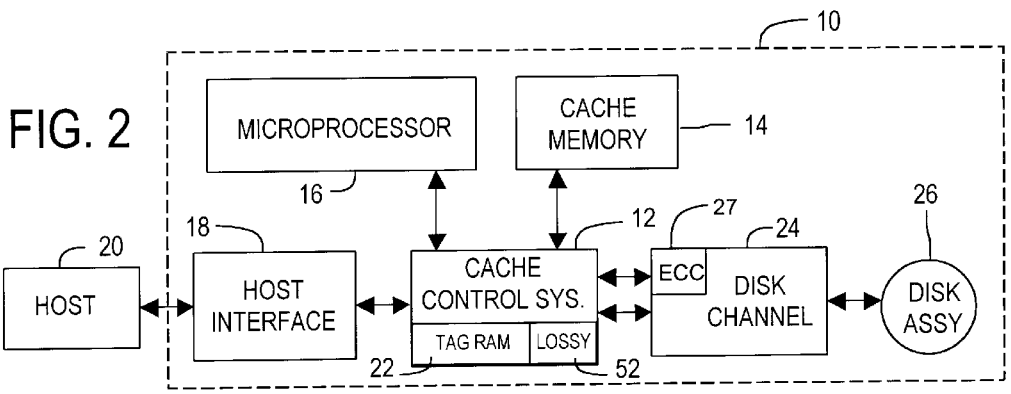
FIG. 2 is a block diagram of a disk drive having a cache control system with a tag memory for defining cache memory segments and for providing the lossy state record for each memory segment.

With reference now to FIG. 2, the disk drive 10 includes a cache control system 12, a cache memory 14, a microprocessor 16, and a host interface 18. The host interface 18 receives host commands from a host 20, such as a personal computer, and transfers disk data between the disk drive 10 and the host 20. The host commands identify the disk data using a start logical block address (LBA) and a count specifying the number of contiguous sectors to be transferred. The cache memory 14 caches the disk data under the direction of the cache control system 12 and microprocessor 16. The microprocessor 16 operates under firmware control and manages the operation of the disk drive 10 and assists hardware elements under specific conditions. The cache memory 14 is random access memory, typically 4 to 16 megabytes (MB). Generally, the larger the cache memory 14, the better the performance of the disk drive 10 in responding to host commands. The cache control system 12 includes a tag memory 22 and a cluster control block (CCB) memory for defining cache memory segments as described below.

The disk drive 10 also includes a disk channel 24, a disk assembly 26, and an error correcting code (ECC) engine 27. The disk assembly 26 includes a hard disk platter that is organized into the disk sectors, typically of 512 bytes, which are individually addressable using a logical block address (LBA). The disk channel 24 performs encoding and decoding of data written to and read from the disk. The ECC engine 27 performs real time analysis of the data read from the disk and corrects read errors, if possible, using redundant error correction data before the data is stored in the cache memory 14.

The cache control system 12 is described in more detail in U.S. patent application Ser. No. 09/552,399, filed Apr. 19, 2000 and titled: RANGE-BASED CACHE CONTROL SYSTEM AND METHOD, which application is hereby incorporated herein by reference. The tag memory 22 in cache control system 12 has a lossy state record for each memory segment. If the ECC engine 27 is unable to correct a read error, the data is stored in a memory segment and the lossy state record for the memory segment is set to be true. The tag memory 22 is static random access memory (SRAM) having a table of tag or segment records and the CCB memory is SRAM having a plurality of records or CCBs (cluster control blocks) 34.

The tag memory 22 is described in more detail with reference to FIGS. 3 and 4. The tag memory 22 has a plurality of tag records 28 that define the memory segments. The memory segments are, formed of memory clusters 36 in the cache memory 14 using chains, 30 and 32, of cluster control blocks 34. Typically, the tag memory 22 may have 32 or 64 records dedicated to defining variable length memory segments. The memory clusters 36 are formed of a plurality of consecutively-numbered sectors 38, each sector typically having 512 byte units. The memory clusters are likewise consecutively numbered, each having a particular cluster number.

The tag memory 22 defines the segments of the cache memory clusters 36 using the CCBs 34. Each tag record 28 has entries or fields (40, 42, 44, 46, 48, 50, 52 and 54) for indicating, respectively, the first disk LBA assigned to the corresponding segment, the number of valid sectors in the segment, the number of sectors allocated to the segment, the first segment CCB, the last segment CCB, state and control flags for the segment, the lossy state for the segment, and the valid offset of the first data error in the memory segment.

Figure 3:
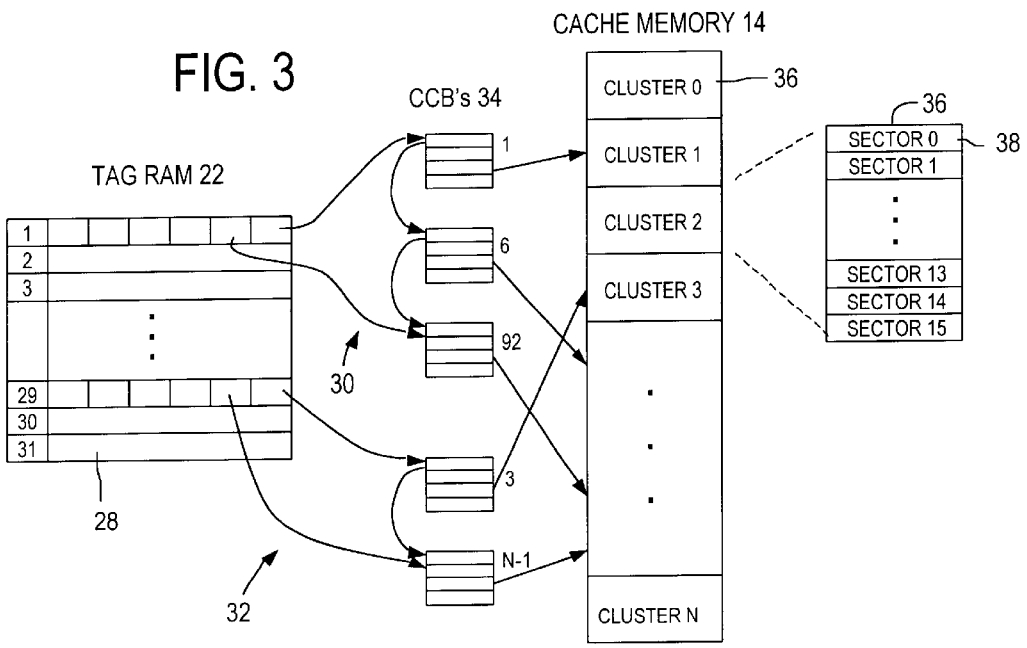
FIG. 3 is a block diagram showing a table of tag records in the tag memory of FIG. 2, for defining the memory segments and for providing the lossy state records.
Figure 4:
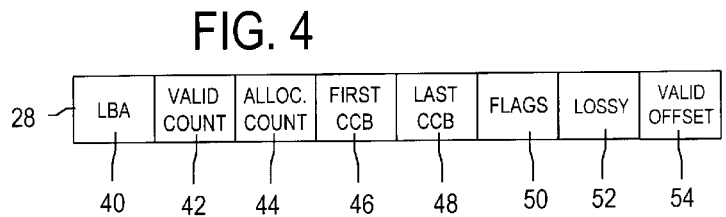
FIG. 4 is a data structure for a tag record in the table of FIG. 3, the data structure including the lossy state record for each associated cache memory segment, according to the present invention.

Two short exemplary segments formed by CCB chains, 30 and 32, are shown in FIG. 3. The first segment is formed by three memory clusters 36: cluster numbers 1, 6 and 92. The tag record 28 number 1 has a first segment CCB entry 46 pointing to the CCB number 1, which CCB is associated with the cluster number 1. The CCB number 1 points to the CCB number 6, which CCB is associated with cluster number 6. The CCB number 6 points to the CCB number 92, which CCB is associated with the cluster number 92. The CCB number 92 has a null value in its next cluster pointer indicating the end of the segment. The first tag record 40 also has an entry 58 pointing to the last segment CCB, which in this case is CCB number 92.

The second segment is defined by the tag record number 29 to have a length of two clusters 36. The first cluster 36 of the segment is the cluster number 3 and the second and last cluster of the segment is the cluster number N-1. Accordingly, the tag record number 29 has a first segment CCB entry 46 pointing to CCB number 3 and a last segment CCB entry 48 pointing to CCB number N-1. The cluster number 3 points to the cluster number N-1, and the cluster number N-1 has a null value in its pointer.

The preferred data structure of the entries (FIG. 4) in the tag records 28 is now described. The first entry 40 in a tag record 28 is a 32-bit address representing the first logical block address of the segment being defined by the tag record 28. The next entry 42 in the tag record 28 is a 10-bit valid count representing the number of valid sectors 38 in the segment. When a data read ahead is performed, the valid count represents the valid data sectors put into the cache memory 14. The next entry 44 in the tag record is a 10-bit allocated count representing the number of cache sectors 38 allocated to the segment. The valid count is never greater than the allocated count. The next entry 46 in the tag record 28 is an 8-bit first segment CCB pointer to the first CCB 34 used in the segment. The next entry 48 in the tag record 28 is an 8-bit last segment CCB pointer. The next entry 50 in the tag record 28 is a series of status and control flags for use by the microprocessor 16, a scan engine, and a hardware write control store or state engine. Among other things, the status and control flags are used for managing tag record allocations and transfers of data between the memory clusters 36 and the host 20, and between the memory clusters 36 and the disk assembly 26.

The lossy state entry or record 52 is a 1-bit field that is set to be true if the associated memory segment is storing disk data that the ECC engine 27 was unable to correct using customary real time error correction techniques. The valid offset entry 54 records the valid count associated with the data error. All disk data preceding the valid offset has no errors.

Another embodiment of the cache control method is described with reference to FIGS. 5A and 5B. In the method, a host command is received for an LBA range that is not stored in the cache memory 14. Thus, the command results in a cache miss (block 150). The cache control system 12 obtains a new tag record 28 for defining a cache memory segment in the cache memory 14 (block 152). The allocated count entry 44 is set equal to the host command's transfer count (block 154). A disk task fetches the disk data for the host command's LBA range (block 156). A data block is read from the disk (block 158). If the data block has no data errors (block 160), the valid count 42 is incremented (block 162), and data blocks are read and tested until the disk task has read all of the data blocks required to respond to the host command (blocks 164 and 166).

If the data block has an unrecoverable error (block 160), i.e., an error that cannot be recovered by the ECC engine 27, then the type of host command is determined (block 168). If the host command is for non-streaming data, then more time consuming signal processing and detection techniques are employed to attempt recovery of the data error (block 170). If the host command is for streaming data (block 168), then the lossy state record 52 is checked (block 172). If the lossy state is true, the valid count 42 is incremented (block 162) and the data block reading continues. If the lossy state is false, the lossy state is set to true (block 174) and the value in the valid count entry 42 is stored in the valid offset entry 44 (block 176).

When the next host command is received (block 180), if the host command's LBA range fails to overlap with the cached LBA range (block 182), a cache miss is indicated (block 184), otherwise a cache hit is indicated. For a cache hit, if the lossy state is set to false (block 186), the disk data in the cache is transferred to the host 20 (block 188). If the lossy state is set to true, then the type of host command is determined (block 190). If the host command is for streaming data, then the disk data, including any data errors, is transferred to the host 20 (block 188). However, if the host command is for non-streaming data, then the disk data preceding the valid offset value is transferred to the host 20 (block 192) and a cache miss is indicated (block 184) for the remaining data in the host command's LBA range. The remaining disk data may be cached as described above (block 150).

In one embodiment, the disk drive controller may autonomously allocate a new cache segment in anticipation of receiving a host command to continue reading a presently accessed data stream. In this event, the controller may perform a sequential "read-ahead" operation to prefetch data for storage in the new cache segment and take advantage of the lossy state to retain data in the cache in the event of an error occuring in the read-ahead data. Preferably, the controller can rotate through a predetermined set of cache segments to maintain streaming continuity.

We claim:

1. A method for caching disk data in a disk drive configured to receive commands for both streaming and non-streaming data from a host, the method comprising the steps of:

providing a memory segment for caching disk data associated with a logical block address range;

caching a plurality of data blocks in the memory segment;

providing a lossy state record for the memory segment;

setting the lossy state record to be true if one of the plurality of data blocks contains a data error, else setting the lossy state record to be false;

receiving a host command specifying a commanded logical block address range and determining whether the commanded logical block address range overlaps the logical block address range cached in the memory segment;

determining whether the host command is for streaming data or non-streaming data, and if the host command is for streaming data and the lossy state record is true, transferring the cached data blocks of the overlapping commanded logical block address range including the block containing the data error to the host; else if the host command is for non-streaming data:

checking the lossy state record and if the lossy state record is false, transferring the cached data blocks of the overlapping commanded logical block address range to the host.

2. The method for caching disk data of claim 1, wherein the step of receiving a host command for non-streaming data further comprises the steps of:

checking the lossy state record and if the lossy state record is true, transferring a subset of the cached data blocks to the host wherein the subset comprises the cached data blocks preceding the data block having an error; and scheduling a disk operation to recover the data block having an error.

3. The method for caching disk data of claim 1, wherein:

the host command is a mode-change host command in that the host command is for streaming data following a previous command for non-streaming data or the host command is for non-streaming data following a previous command for streaming data; and the plurality of data blocks remain cached in the memory segment for the mode-change host command.

4. An apparatus for caching disk data in a disk drive configured to receive commands for both streaming and non-streaming data from a host, comprising:

a memory segment for caching disk data associated with a logical block address range;

means for caching a plurality of data blocks in the memory segment;

a lossy state record for the memory segment;

means for setting the lossy state record to be true if one of the plurality of data blocks contains a data error, else setting the lossy state record to be false;

means for receiving a host command specifying a commanded logical block address range and determining whether the commanded logical block address range overlaps the logical block address range cached in the memory segment;

means for determining whether the host command is for streaming data or non-streaming data, and if the host command is for streaming data and the lossy state record is true, transferring the cached data blocks of the overlapping commanded logical block address range including the block containing the data error to the host; else if the host command is for non-streaming data, checking the lossy state record and if the lossy state record is false, transferring the cached data blocks of the overlapping commanded logical block address range to the host.

5. The apparatus for caching disk data of claim 4, wherein for a host command for non-streaming data, the means for determining further:

checks the lossy state record and if the lossy state record is true, transfers a subset of the cached data blocks to the host wherein the subset comprises the cached data blocks preceding the data block having an error; and schedules a disk operation to recover the data block having an error.

6. The apparatus for caching disk data of claim 4, wherein:

the host command is a mode-change host command in that the host command is for streaming data following a previous command for non-streaming data or the host command is for non-streaming data following a previous command for streaming data; and the plurality of data blocks remain cached in the memory segment for the mode-change host command.

7. A method for caching disk data in a disk drive configured to receive commands for both streaming and non-streaming data from a host, the method comprising the steps of:

providing a memory segment for caching disk data associated with a logical block address range;

caching a plurality of data blocks in the memory segment, wherein at least one of the data blocks comprises a data error and at least one of the data blocks is error free;

receiving a host command specifying a commanded logical block address range and determining whether the commanded logical block address range overlaps the logical block address range cached in the memory segment;

if the host command is for streaming data, transferring the cached data blocks of the overlapping commanded logical block address range including the data block containing the data error to the host; and if the host command is for non-streaming data, transferring the at least one error free cached data block of the overlapping commanded logical block address range to the host.

8. The method for caching disk data of claim 4, wherein the step of receiving a host command for non-streaming data further comprises the step of scheduling a disk operation to recover the data block having an error.

9. The method for caching disk data of claim 4, wherein:

the host command is a mode-change host command in that the host command is for streaming data following a previous command for non-streaming data or the host command is for non-streaming data following a previous command for streaming data; and the plurality of data blocks remain cached in the memory segment for the mode-change host command.

10. A disk drive for caching disk data, the disk drive configured to receive commands for both streaming and non-streaming data from a host, the disk drive comprising:

a memory segment for caching a plurality of data blocks associated with a logical block address range, wherein at least one of the data blocks comprises a data error and at least one of the data blocks is error free;

control circuitry for:

receiving a host command specifying a commanded logical block address range and determining whether the commanded logical block address range overlaps the logical block address range cached in the memory segment;

if the host command is for streaming data, transferring the cached data blocks of the overlapping commanded logical block address range including the data block containing the data error to the host; and if the host command is for non-streaming data, transferring the at least one error free cached data block of the overlapping commanded logical block address range to the host.

11. The disk drive for caching disk data of claim 10, wherein the control circuitry for scheduling a disk operation to recover the data block having an error.

12. The disk data for caching disk data of claim 10, wherein:

the host command is a mode-change host command in that the host command is for streaming data following a previous command for non-streaming data or the host command is for non-streaming data following a previous command for streaming data; and the plurality of data blocks remain cached in the memory segment for the mode-change host command.

* * * * *